(12) United States Patent
Östergaard

(10) Patent No.: US 6,499,773 B1
(45) Date of Patent: Dec. 31, 2002

(54) ARTICULATED CLAMP CONNECTOR

(75) Inventor: Inge Östergaard, Heggedal (NO)

(73) Assignee: ABB Offshore Systems AS, Billingstad (NO)

( * ) Notice: Subject to any disclaimer, the term of this patent is extended or adjusted under 35 U.S.C. 154(b) by 0 days.

(21) Appl. No.: 09/743,579

(22) PCT Filed: Jul. 9, 1999

(86) PCT No.: PCT/NO99/00231

§ 371 (c)(1),
(2), (4) Date: Mar. 13, 2001

(87) PCT Pub. No.: WO00/05527

PCT Pub. Date: Feb. 3, 2000

(30) Foreign Application Priority Data

Jul. 13, 1998 (NO) ................................................ 983224

(51) Int. Cl.[7] ................................................ F16L 23/00
(52) U.S. Cl. ........................ 285/408; 285/367; 285/411; 285/420; 403/338
(58) Field of Search ................................ 285/411, 367, 285/408, 420; 403/321, 322.1, 338

(56) References Cited

U.S. PATENT DOCUMENTS

| | | | | |
|---|---|---|---|---|
| 2,720,079 A | * | 10/1955 | Chester | .................. 285/411 X |
| 2,895,748 A | * | 7/1959 | Oldham | ....................... 285/410 |
| 3,398,978 A | * | 8/1968 | Gasche | ....................... 285/187 |
| 3,661,409 A | | 5/1972 | Brown et al. | |
| 3,797,078 A | * | 3/1974 | LaPointe | .................. 24/367 X |
| 4,191,410 A | | 3/1980 | Voituriez et al. | |
| 4,225,160 A | * | 9/1980 | Ortloff | ..................... 285/367 X |
| 5,707,089 A | * | 1/1998 | Fend | ............................ 285/367 |
| 6,290,182 B1 | * | 9/2001 | Grunditz | ...................... 244/131 |

* cited by examiner

Primary Examiner—Lynne H. Browne
Assistant Examiner—Aaron Dunwoody
(74) Attorney, Agent, or Firm—Wenderoth, Lind & Ponack, L.L.P.

(57) ABSTRACT

An articulated clamp connector is for interconnecting pipes, cables, etc. preferably underwater, where interconnecting ends of pipes are provided with connecting flanges with outer conical surfaces which interact with opposite surfaces of the clamp. When joining the pipes, the connecting flanges are pressed against each other and provide a metal seal between the flanges. The clamp connector has a set of outer articulated clamp halves for placing around the joining flanges, and a first tightening bolt for closing the outer clamp halves around the joining flange. Further, the clamp coupling has a split activating ring slideably arranged inside the outer clamp halves, a second tightening bolt arranged for tangential movement of the split activating ring, a number of spring elements arranged between the split activating ring and locking segments. These spring elements are placed in grooves, respectively, in the inner part of the split activating ring and the outer part of the locking segments. Tangential movement of the split activating ring when tightening the second tightening bolt, thus produces radial movement of the locking segments and the inner coned surfaces of the locking segments press the joining flanges together. Thus, an even distribution of pretension around the joining flanges is achieved, which initiates and maintains pretension in a metal sealing connection.

4 Claims, 5 Drawing Sheets

ARTICULATED CLAMP CONNECTOR

BACKGROUND OF THE INVENTION

1. Field of the Invention

The invention concerns an articulated clamp connector for interconnecting pipes, cables, etc. where metal seals are used in the connecting surfaces. The clamp connector is preferably intended for subsea applications where there are high requirements on reliability and integrity.

2. Description of the Related Art

Interconnecting pipes, etc. in a subsea (underwater) environment place severe demands on the connection arrangement, both with regard to the operation of the connection arrangement during interconnection and disconnection, and also the function of the connector system, i.e. reliability and tightness in the connector, during use and in connection with, for example, deep sea activities and the transport of oil and gas under high pressure.

A need with such connectors is, therefore, to meet both the requirement of simple operation, that is, the mounting/dismounting of the connector, while at the same time meeting the reliability requirement for the connector during use.

There are innumerable variants of mechanical connectors within this field. These connectors can be divided into two groups. Group 1 consists of segment/collet type connectors and group 2 consists of clamp type connectors. Both connector groups have the common goal of seeking to achieve an axial pretension between the connector flanges where segments or clamps respectively generate this force. This is achieved through a wedge effect between one or more conical outer surfaces (flange profile) arranged on parts that are to be connected and opposite surfaces in the connector segment or clamps, where the latter is sought to be displaced by a radial force produced by the mechanics in the connector. Both these groups have the following properties.

Group 1 is characterized by the segment being run mechanically, either by an outer cam ring that causes rotation of a set of collet fingers, or directly driven locking segments, both based on radial running of the mentioned segments. There is significant interaction between a connector house of one of the flanges and the other connection flange, making it necessary to perform an axial joining movement between the flanges before the connection itself can be performed. This movement must be provided by use of mechanical flexibility in the pipe system, or alternatively, in some other way. The main advantage of this group of connectors is an even distribution of the pretension force. The main disadvantage is a deep interaction (engagement), with corresponding limited possibility for replacing metal gaskets on site, for example, by use of a remotely operated vehicle (ROV), as well as a correspondingly costly embodiment of the connector house.

Group 2 is characterized by the clamps, in 180° design (in two parts) or 60° design (in three parts) hinged/bolted, being operated with a screw-based mechanism where only parts of the clamp move radially towards the flange center. The main advantage with this solution is that a hinged variant entails reduced requirements of the connecting movement, as well as that an emergency opening can be performed with cutting only a single bolt. The main disadvantage is that the loss of friction in the arrangement between the flanges and the clamps disrupts the distribution of axial tension. This results in the clamp connector having to be over-dimensioned to compensate for low mechanical efficiency. The function required from the clamp is complex and must be made subject to a compromise. Thus, it is typically a contradictory requirement that must be met with regard to the clamp's structural stiffness, "stiff enough" to carry tangential forces, "soft enough" at reduced bending resistance, to offer resiliency when tightening involves placing the clamps in a smaller circle segment. This may be solved by making several linked clamp elements, according to the "bicycle chain principle".

SUMMARY OF THE INVENTION

The articulated clamp connector according to the present invention seeks to combine the advantages with the seals according to above mentioned groups 1 and 2 connectors.

The aim of the present invention is, therefore, to achieve a connector that simply can be mounted around a joint where, for example, two pipes that are to be connected only to a minimal degree, need be moved apart to apply the connector. Furthermore, the connector shall be easy to operate. That is, it shall be able to be easily locked around the connection and in the same manner, securely and easily opened, for example, in an emergency situation. The connection must be reliable and leak free, as an even distribution of pretension must be achieved between the connection's metal meeting surfaces.

A very important aim for the clamp connector according to the present invention is to produce mechanical tension between two flanges so that a metallic sealing ring creates a tight connection between the flanges, especially for this purpose. The operation is reversible and may be performed manually or with the use of automated tool systems, the latter in connection with underwater (subsea) operations without the use of divers.

More specifically, the aim of this invention is a clamp connector consisting of a mechanical arrangement containing a split or whole tangential working ring for activating radial pawl, the purpose of which is to achieve even distribution of pretension around a flange pair, which is necessary to initiate and maintain pretension in a metal seal connection.

The above mentioned goals are achieved according to the invention by an articulated clamp connector for connecting pipes, cables, etc., preferably subsea, where the interconnecting ends of the pipes are constructed with joining flanges with outer conical surfaces which interact with opposite surfaces of the clamp, whereby the connecting flanges are pressed against each other during the connection, bringing about a metal seal between the flanges, in that the clamp connector constitutes a set of outer articulated clamp halves placed around the connecting flanges, and a first tightening bolt for closing of the outer clamp halves around the connecting flanges. The clamp connector further comprising a split activating ring slideably arranged within the outer clamp halves, a second tightening bolt arranged for tangential movement of the split activating ring, a number of spring elements arranged between the split activating ring and locking segments placed in grooves, respectively, in the inner part of the split activating ring and the outer part of the locking segments, whereby tangential movement of the split activating ring by use of the second tightening bolt brings about radial movement of the locking segments and the locking segments inside conical surfaces force the connecting flanges together, thus achieving an even distribution of pretension around the connecting flanges to initiate and maintain pretension in the metal seal connection.

BRIEF DESCRIPTION OF THE DRAWINGS

Embodiments of an articulated clamp connector according to the present invention will now be explained with reference to the drawing, where.

DETAILED DESCRIPTION OF THE INVENTION

The clamp connector 1 will first and foremost be explained with reference to FIGS. 1–6, which show the first embodiment of the invention. FIGS. 7–13 show a second embodiment of the clamp connector 1 in a somewhat more detailed embodiment. Corresponding parts of the clamp connector 1, however, are given the same reference numbers in both embodiments of the invention, and thus, the description of the first embodiment will also bring about the description of the second embodiment.

Figure 1:
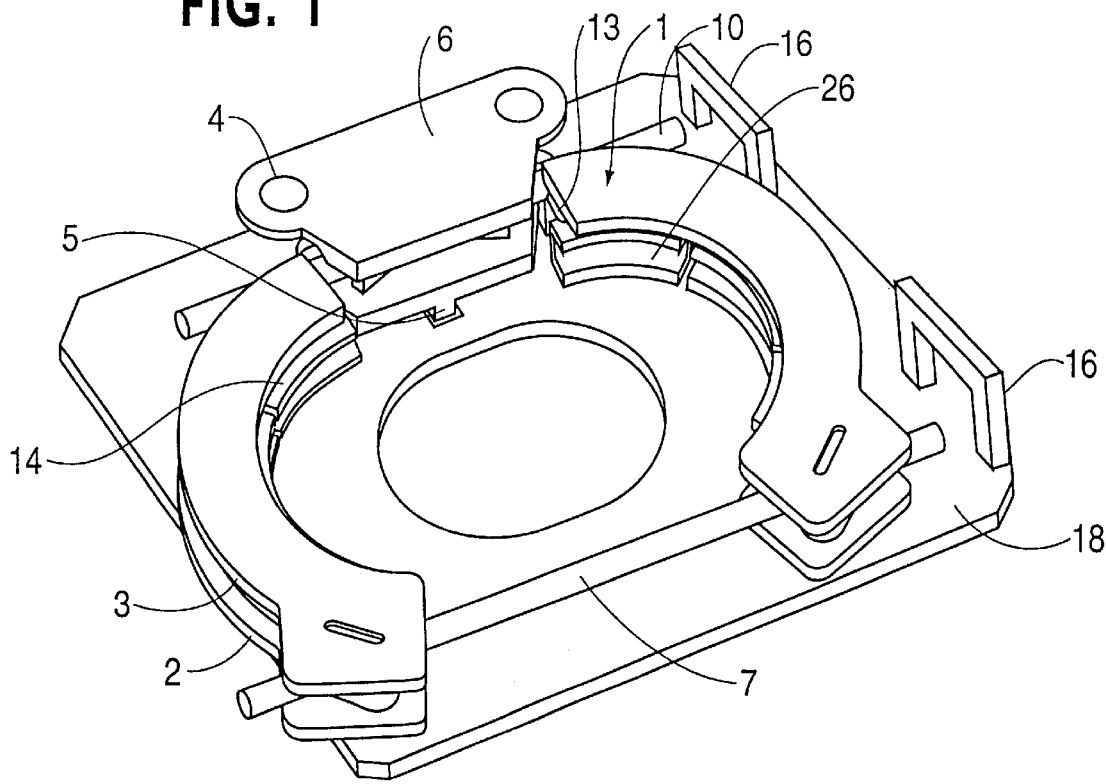
FIG. 1 shows a first embodiment of the clamp connector in open position before, for example, being tightened around a pipe connection.
Figure 2:
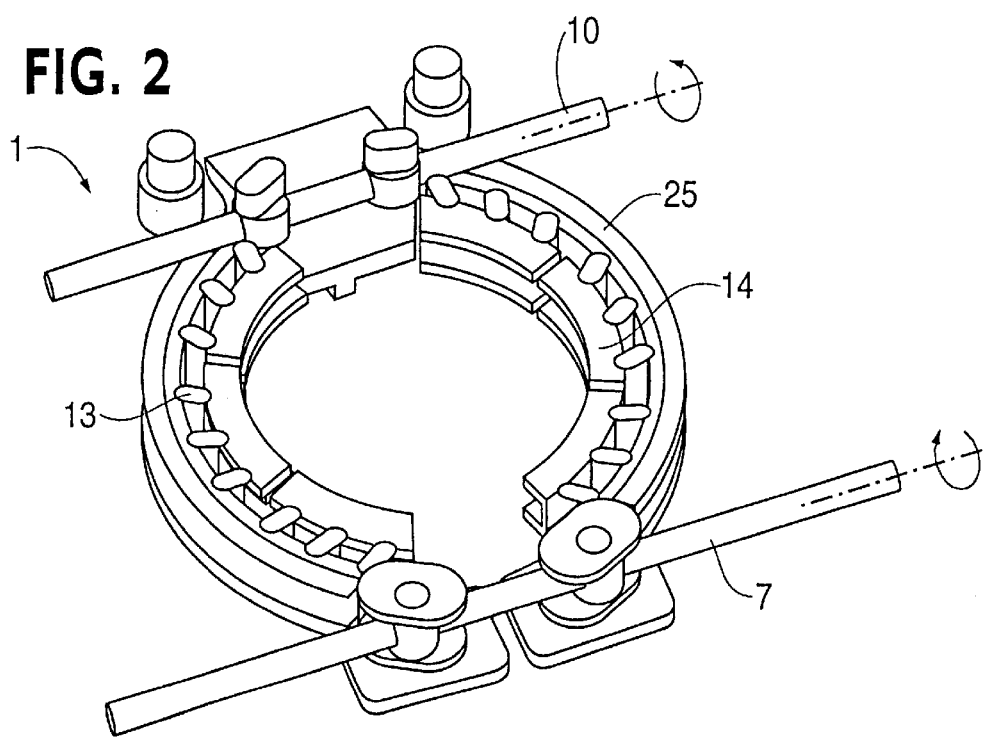
FIG. 2 shows the first embodiment of the clamp connector in a position where, for example, it is fastened around a pipe connection, and upper flanges of the clamp connector are removed to better illustrate the connector's individual elements.
Figure 3:
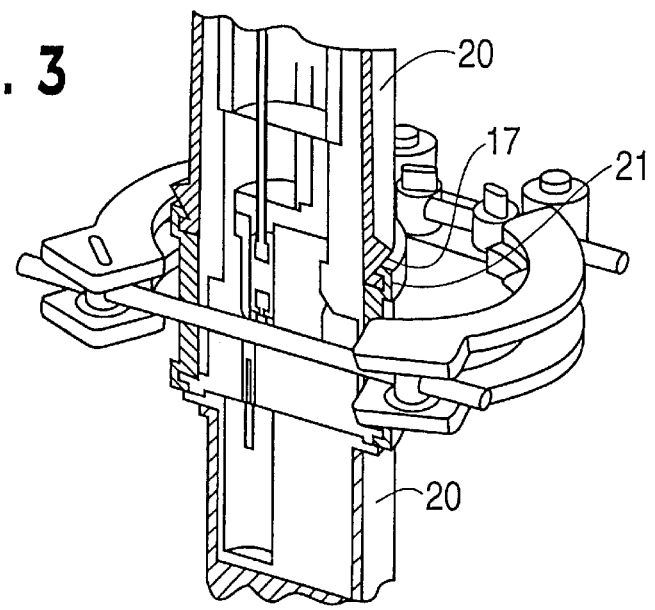
FIG. 3 shows the clamp connector described above, placed in an open position around a pipe connection.
Figure 4:
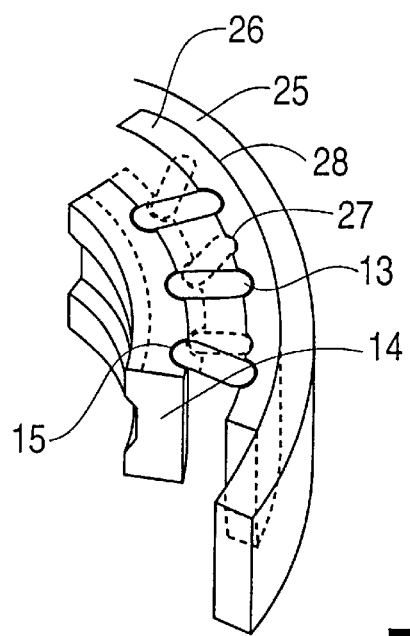
FIG. 4 shows detailed design elements in the clamp connector described above.
Figure 5:
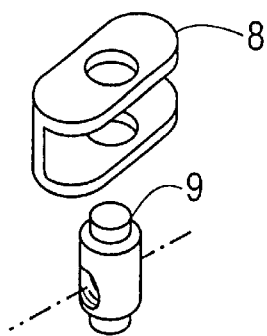
FIG. 5 shows a detail of design elements in a tension system's first activating step for the above mentioned clamp connector.
Figure 6:
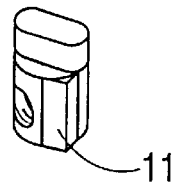
FIG. 6 shows a detail of a design element in the tension system's second activating step, for the first embodiment of the clamp connector.
Figure 7:
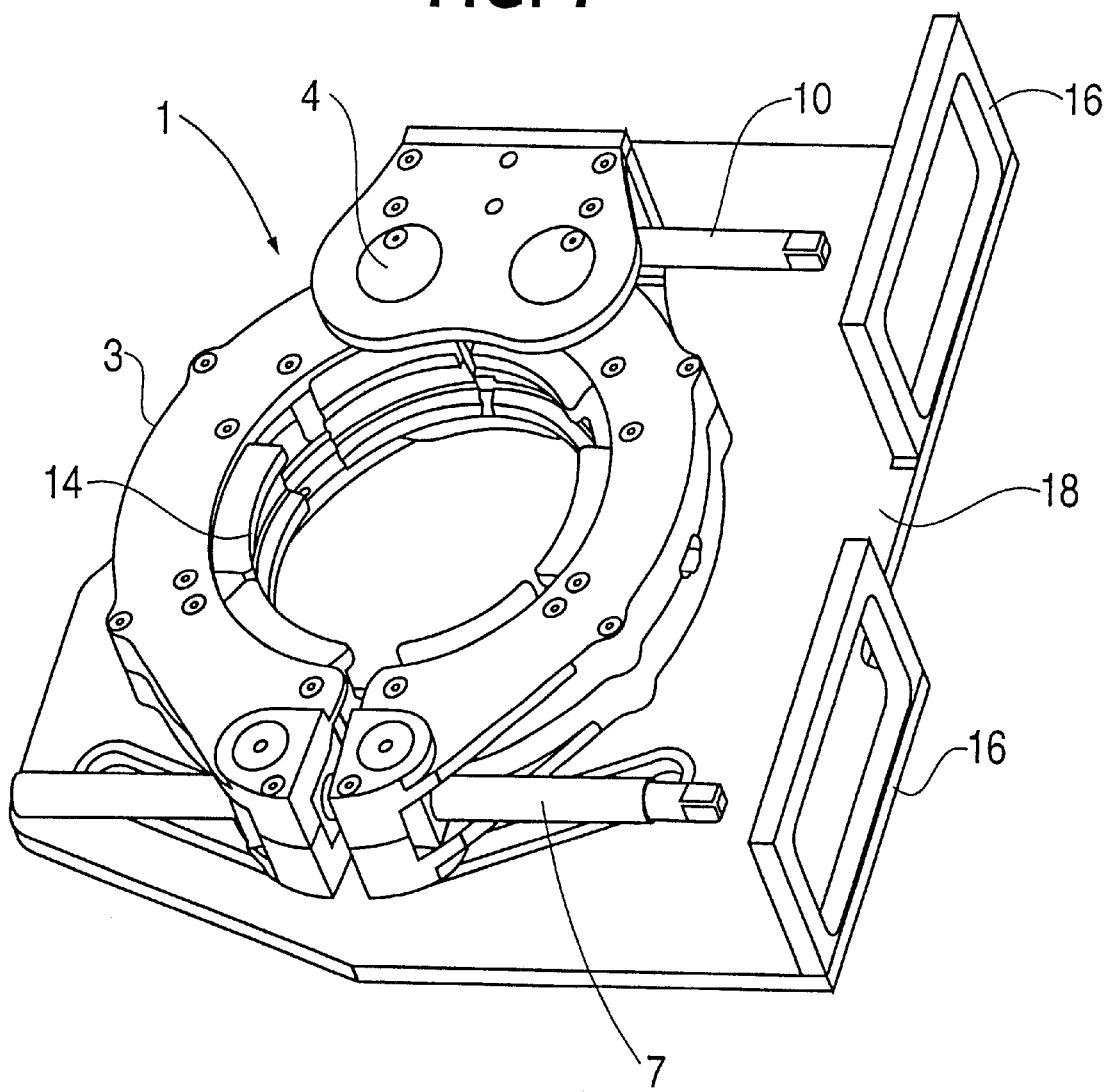
FIG. 7 shows a second embodiment of the clamp connector according to the invention.
Figure 8:
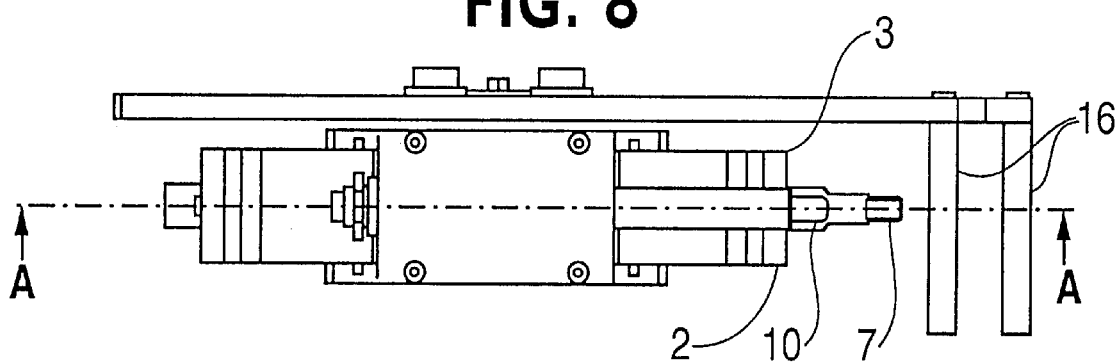
FIG. 8 shows a side view of the connector according to FIG. 7.
Figure 9:
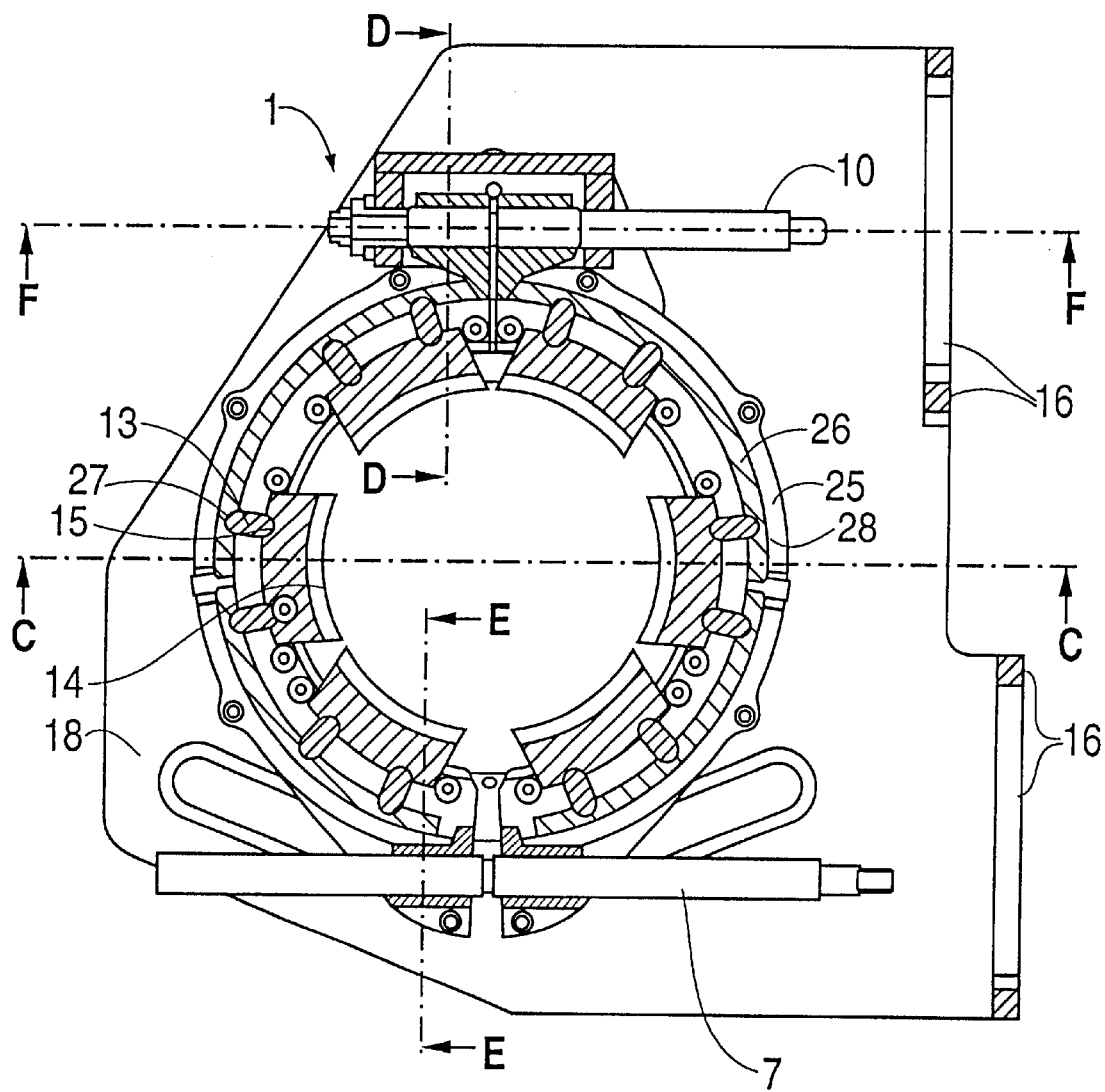
FIG. 9 shows a cross section through A—A in FIG. 8.
Figure 10:
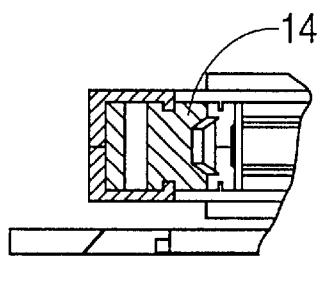
FIG. 10 shows a cross section through C—C in FIG. 9.
Figure 11:
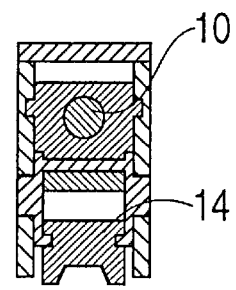
FIG. 11 shows a cross section through D—D in FIG. 9.
Figure 12:
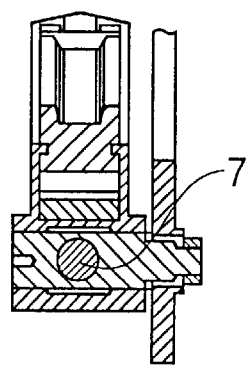
FIG. 12 shows a cross section through E—E in FIG. 9.
Figure 13:
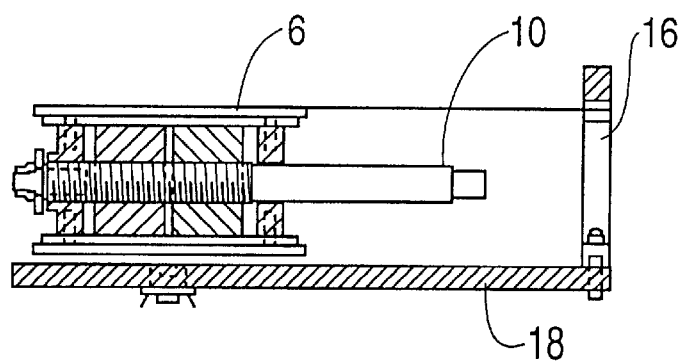
FIG. 13 shows a cross section through F—F in FIG. 9.

With reference to FIGS. 1–6 and particularly FIG. 3, the clamp connector 1 is shown in an open position around a connection area of two pipes 20 that are to be connected. As is apparent from FIG. 3, the pipes 20 are arranged with connecting flanges 17. The connecting flanges 17 are further shaped with conical outer flange surfaces that fit into corresponding conical inner surfaces of the locking segments 14. By forcing the connecting flanges together, a metal connection seal 21 will be produced between the respective flanges 17. Preferably, with reference to FIG. 1, the articulated clamp connector 1 consists of, respectively, a lower hinged clamp flange 2 and an upper clamp flange 3. The hinge is made up of a hinge bolt 4. The hinge system also includes a lower hinge plate 5 with steering wedges and an upper hinge plate 6. A first tightening bolt 7 with a swing bolt guide 8 and swing bolt screw 9 is arranged to the clamp connector 1 in order to perform a first closing of the connector, as shown in FIG. 2, such that a "ring structure" is created to carry the pretension forces. The clamp connector 1 is further arranged with a second tightening screw 10 with a guided pawl screw 11 for tightening the bolt and the activating a two-part activating ring 26. With reference to FIG. 2, the clamp connector 1 is shown without the upper clamp flange 3, so that the connector's "inner" constructional elements are revealed. The clamp connector's outer clamp halves 25, the activating rings 26 with grooves 27 for spring elements 13, and locking segments 14 with grooves 15 for spring elements 13 are shown. For example, a low friction (XYLAN) coating 28 is arranged on the inner surface of the outer clamp halves 25, that is the surface towards the activating rings 26. The low friction coating 28 reduces the friction between the outer clamp halves 25 and the activating rings 26 when the activating rings 26 are set in a tangential movement by the second tightening bolt. As shown in FIG. 4, the tangential movement of the activating ring 26 results in the spring elements 13 pushing the inner activating rings radially towards the connecting flanges 17. The locking segments 14 are thus subjected to a radial movement after the connector has been closed round the flanges. The first operation gives an initial contact interaction between the conical surfaces of the flanges 17 and likewise, to the corresponding locking segments 14. Through the second operation, the locking segments 14 are given a direct radial movement, thus achieving an even axial distribution of pretension over the flanges' circumferences. During use, the second tightening bolt 10 will push the pawl screw 11 in tracks arranged on the mounting base plate 18 and the reaction plates 16. The mechanical solution in connection with the second tightening bolt 10, where a tangential movement is transformed into a radial movement of the locking segments 14, produces a favorable effect with regard to the constructional dimensions of the clamps which are often critical for the building height of complementary equipment. Thus, the clamp connector's outer dimensions can be reduced considerably in relation to known solutions. The second tightening bolt 10 will, during use, raise the spring elements 13 and bring the locking segments 14 into contact with the connecting flanges 17. This mechanical solution can be exploited to generate a self-locking position of the locking segments 14 by the spring elements 13 moving slightly over their "dead point" and thus, relieving the compression force in the second tightening bolt 10. The second tightening bolt 10 can then be returned to its staring point, a position that is necessary for possible future opening of the connector. This helps to ensure that the opening operation can be completed, and, in fact, an emergency opening by cutting the first tightening bolt 7 can be made as safely as a traditional double hinged clamp. Thus, a connector with improved features with regards to pretension is achieved, without complicating the opening/emergency opening. The clamp connector 1 according to the present invention is hinged and the connector can thus be lowered between two closely placed flanges 17, where the initial distance between the flanges 17 can be restricted to the diameter of the first tightening bolt, plus a bit of space on each side. This reduces the need for relative movement between the flanges 17 to a minimum, which, in turn, reduces the need for mechanical flexibility in the surrounding pipe system to a minimum. The alternative without this embodiment is an initial distance between the flanges corresponding to the thickness/height of the clamp itself, something which sets greater requirements to interaction movement.

Operating the articulated clamp connector 1 according to the present invention is carried out in two operations to achieve a closed/pretensioned position. However, the connector can be more easily opened, since the connectors hinge arrangement is such that during opening of the first tightening bolt 7, the interaction against the tightening screw 10 in this context is "escaping", so that this can be carried out directly without reversing both of the two operations to close/pretensioned position. It is also the case that an "emergency opening" of the connector 1 can be carried out undisturbed by the second tightening bolt 10, which, moreover, is the normal procedure for subsea applications, and this is done by cutting the first tightening bolt 7.

What is claimed is:

1. An articulated clamp connector for interconnecting pipes or cables having connecting flanges with outer conical surfaces located at their ends, said articulated clamp comprising:
    a pair of outer articulated clamp halves being adapted to be placed around a pair of connecting flanges with outer conical surfaces of adjacent pipes or cables;
    a first tightening bolt being operable to close said pair of outer articulated clamp halves around the pair of connecting flanges;
    a split activating ring comprising two portions, said split activating ring having grooves located at an inner part thereof, and said split activating ring being slidably arranged inside of said pair of outer articulated clamp halves;
    a second tightening bolt adapted to cause said two portions of said split activating ring to have tangential movement towards or away from each other;
    a plurality of locking segments having inner coned surfaces;
    a plurality of spring elements being located in the grooves of said split activating ring, said plurality of spring elements being arranged between said inner part of said split activating ring and an outer part of said plurality of locking segments, wherein the tangential movement of said split activating ring by tightening said second tightening bolt produces a radial movement of said plurality of locking segments such that said inner coned surfaces of said plurality of locking segments press the pair of the connecting flanges together to produce an even distribution of pretension around the pair of connecting flanges.

2. An articulated clamp connector according to claim 1, wherein inner surfaces of said pair of outer articulated clamp halves have a low friction coating located thereon.

3. An articulated clamp connector according to claim 1, wherein said plurality of spring elements each have a cylindrical shape at their area of contact with said inner part of said split activating ring and said outer part of said plurality of locking segments.

4. An articulated clamp connector according to claim 2, wherein said plurality of spring elements each have a cylindrical shape at their area of contact with said inner part of said split activating ring and said outer part of said plurality of locking segments.

* * * * *